US012750639B2

(12) United States Patent
Gilson

(10) Patent No.: US 12,750,639 B2
(45) **Date of Patent: *Sep. 29, 2026**

(54) TEXT ALTERNATIVE TO ESTABLISHED VOICE CALL SESSION

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 876 days.

This patent is subject to a terminal disclaimer.

(21) Appl. No.: 17/368,392

(22) Filed: Jul. 6, 2021

(65) Prior Publication Data

US 2021/0392474 A1 Dec. 16, 2021

Related U.S. Application Data

(63) Continuation of application No. 16/860,253, filed on Apr. 28, 2020, now Pat. No. 11,096,019, which is a continuation of application No. 16/809,145, filed on Mar. 4, 2020, now Pat. No. 11,076,268, which is a continuation of application No. 15/474,451, filed on (Continued)

(51) Int. Cl.
*H04W 4/12* (2009.01)
*H04M 3/42* (2006.01)

(52) U.S. Cl.
CPC ......... *H04W 4/12* (2013.01); *H04M 3/42382* (2013.01); *H04M 3/42365* (2013.01); *H04M 2203/651* (2013.01)

(58) Field of Classification Search
CPC ............... H04W 4/12; H04M 3/42382; H04M 2203/651; H04M 3/42365
See application file for complete search history.

(56) References Cited

U.S. PATENT DOCUMENTS

| | | | |
|---|---|---|---|
| 5,579,383 | A | 11/1996 | Bales et al. |
| 5,828,744 | A | 10/1998 | Nemoto |

(Continued)

FOREIGN PATENT DOCUMENTS

| | | | |
|---|---|---|---|
| CA | 2727061 | A1 | 7/2011 |
| GB | 2454567 | A | 5/2009 |
| WO | 2007/019482 | A2 | 2/2007 |

OTHER PUBLICATIONS

EP10196552 European Search Report dated May 23, 2011.

(Continued)

*Primary Examiner* — Congvan Tran
(74) *Attorney, Agent, or Firm* — Banner & Witcoff, Ltd.

(57) ABSTRACT

Methods and systems are described wherein an initiating device sends a communication requesting a voice call session with a recipient device. In response, the initiating device receives a communication indicating that the initiating device can provide a text message instead of establishing the voice call session. In some cases, the communication may refuse the request voice call session, while in other cases the communication may simply indicate that the recipient device supports text messaging as an alternative to voice mail. As a result of the received communication, the initiating device outputs a text input prompt. After receiving text input in response to the prompt, the initiating device sends a text message containing the received text input.

24 Claims, 9 Drawing Sheets

Related U.S. Application Data

Mar. 30, 2017, now Pat. No. 10,623,913, which is a continuation of application No. 14/571,016, filed on Dec. 15, 2014, now Pat. No. 9,648,469, which is a continuation of application No. 13/614,519, filed on Sep. 13, 2012, now Pat. No. 8,942,741, which is a continuation of application No. 12/688,261, filed on Jan. 15, 2010, now Pat. No. 8,290,525.

(56) References Cited

U.S. PATENT DOCUMENTS 6,154,644 A * 11/2000 Murray ........ H04Q 3/0029 455/461
6,185,433 B1 2/2001 Lele et al.
6,408,177 B1 * 6/2002 Parikh ........ H04W 4/16 455/414.4
6,640,115 B1 10/2003 Fujimoto et al.
6,842,449 B2 1/2005 Hardjono
7,203,297 B2 4/2007 Vitikainen et al.
7,260,205 B1 8/2007 Murphy et al.
7,499,529 B1 3/2009 Kvache et al.
8,032,118 B1 * 10/2011 Othmer ........ H04M 3/53358 455/412.2
8,200,196 B2 * 6/2012 David ........ H04M 3/42017 455/414.1
8,494,145 B2 * 7/2013 Spear ........ H04L 65/1073 379/211.01
8,744,059 B2 6/2014 Ganganna
8,891,748 B2 * 11/2014 Rand ........ H04M 7/1205 379/201.11
2002/0006782 A1 * 1/2002 Kim ........ H04W 4/12 455/412.2
2003/0086540 A1 5/2003 Brandt
2003/0169865 A1 9/2003 Oren
2003/0179762 A1 9/2003 Isomaki et al.
2004/0110513 A1 6/2004 Csorba
2005/0036446 A1 2/2005 Jang et al.
2005/0037785 A1 * 2/2005 Chen ........ H04M 3/42382 455/466
2005/0198096 A1 9/2005 Shaffer et al.
2005/0220079 A1 10/2005 Asokan
2005/0254485 A1 11/2005 Parker et al.
2006/0023695 A1 2/2006 Yarlagadda et al.
2006/0026254 A1 2/2006 Kessen et al.
2006/0040687 A1 2/2006 Yoon et al.
2006/0230161 A1 10/2006 Bae et al.
2006/0251223 A1 * 11/2006 Vitikainen ........ H04Q 3/0016 379/207.02
2007/0036286 A1 2/2007 Champlin et al.
2007/0050510 A1 * 3/2007 Jiang ........ H04W 4/12 709/227
2007/0121901 A1 5/2007 Mathal et al.
2007/0198253 A1 8/2007 Luehrig et al.
2008/0020777 A1 1/2008 Zhang et al.
2008/0025482 A1 1/2008 Susama et al.
2008/0039150 A1 * 2/2008 Lin ........ H04N 7/15 348/E7.083
2008/0081617 A1 * 4/2008 Yoo ........ H04W 8/28 455/433
2008/0132209 A1 * 6/2008 Willey ........ H04M 1/2749 455/412.2
2008/0153522 A1 6/2008 Liu et al.
2008/0263158 A1 10/2008 del Cacho et al.
2008/0279358 A1 11/2008 Kim et al.
2008/0304470 A1 * 12/2008 Ganganna ........ H04L 65/1096 370/352
2008/0304637 A1 * 12/2008 Ganganna ........ H04M 3/436 379/88.23
2009/0047933 A1 2/2009 Spitzer
2009/0054092 A1 2/2009 Stonefield et al.
2009/0086719 A1 4/2009 Mutikainen et al.
2009/0097624 A1 4/2009 Sangberg et al.
2009/0147778 A1 * 6/2009 Wanless ........ H04M 7/0054 455/466
2009/0161609 A1 6/2009 Bergstrom
2009/0239584 A1 * 9/2009 Jheng ........ H04W 12/06 455/558
2009/0268897 A1 * 10/2009 Coppage ........ H04M 7/0057 379/221.01
2009/0276303 A1 * 11/2009 Singhal ........ G06Q 30/0257 705/14.53
2009/0304167 A1 12/2009 Wright et al.
2009/0325620 A1 * 12/2009 Brewer ........ H04W 4/10 455/518
2010/0009674 A1 * 1/2010 Sapkota ........ H04L 65/1093 455/466
2010/0041375 A1 2/2010 Osborn
2010/0054433 A1 3/2010 Gustave et al.
2010/0067456 A1 3/2010 Xu et al.
2010/0080363 A1 * 4/2010 Lesher ........ H04M 3/4872 379/88.19
2010/0081431 A1 * 4/2010 Willey ........ H04M 1/2749 455/432.1
2010/0091707 A1 4/2010 Janneteau et al.
2010/0093315 A1 4/2010 Grosch et al.
2010/0097440 A1 * 4/2010 Lee ........ H04N 7/147 348/14.02
2010/0150333 A1 * 6/2010 Goodman ........ G10L 13/00 704/235
2010/0216500 A1 8/2010 Shatsky
2010/0246785 A1 9/2010 Wang et al.
2010/0290424 A1 11/2010 Collingrige
2011/0111735 A1 5/2011 Pietrow
2011/0117900 A1 * 5/2011 Reunamaki ........ H04M 3/42382 455/418
2011/0151838 A1 6/2011 Olincy et al.
2011/0151852 A1 6/2011 Olincy et al.
2011/0151864 A1 6/2011 Byun et al.
2011/0213657 A1 9/2011 O'Malley et al.
2011/0249082 A1 10/2011 Xue
2011/0317621 A1 12/2011 Nagasawa et al.
2015/0038182 A1 2/2015 Carpenter
2015/0189064 A1 * 7/2015 Major ........ H04W 4/14 455/466

OTHER PUBLICATIONS

European Office Action—EP Appl. 10196552.3—dated Mar. 29, 2016.
CA Office action—CA 2,727,061—Mailing date: Nov. 23, 2016.
Nov. 9, 2017—Canadian Office Action—CA 2,727,061.
Jun. 12, 2018—European Summons to Oral Proceedings—EP 10196552.3.
Oct. 31, 2018—Canadian Office Action—CA 2,727,061.
Dec. 19, 2019—Canadian Office Action—CA 2,727,061.
Dec. 13, 2021—Canadian Office Action—CA 2,727,061.
Jan. 25, 2023—CA Office Action—CA App. No. 2,727,061.

* cited by examiner

TEXT ALTERNATIVE TO ESTABLISHED VOICE CALL SESSION

RELATED APPLICATION

This application is a continuation of and claims priority to U.S. patent application Ser. No. 16/860,253, filed Apr. 28, 2020, which is a continuation of U.S. patent application Ser. No. 16/809,145, filed Mar. 4, 2020, which is a continuation of U.S. patent application Ser. No. 15/474,451, filed Mar. 30, 2017, now U.S. Pat. No. 10,623,913, which is a continuation of U.S. patent application Ser. No. 14/571,016, filed Dec. 15, 2014, now U.S. Pat. No. 9,648,469, which is a continuation of U.S. patent application Ser. No. 13/614,519, filed Sep. 13, 2012, now U.S. Pat. No. 8,942,741, which is a continuation of U.S. patent application Ser. No. 12/688,261 filed Jan. 15, 2010, now U.S. Pat. No. 8,290,525, each of which is incorporated by reference herein in its entirety.

BACKGROUND

When attempting to establish a telephone call or other type of interactive voice communication, the called party may be unable or unwilling to accept the incoming call. In such a circumstance, it is often useful to provide some type of message for the called party. Typically, voice mail systems have been used for this purpose. In certain situations, however, voice mail may not be ideal. For example, a called party may be in a loud room or other environment in which conducting a voice call or listening to a voice mail may be impractical. However, the called party may still be desirous of receiving information from the calling party. Although other forms of communication such as text messaging are available, there is no known way to link a text message with a failed call attempt.

SUMMARY

This Summary is provided to introduce a selection of concepts in a simplified form that are further described below in the Detailed Description. This Summary is not intended to identify key features or essential features.

In a method according to at least some embodiments, an initiating device sends a communication requesting a voice call session with a recipient device. In response, the initiating device receives a communication indicating that the initiating device can provide a text message instead of establishing the voice call session. In some cases, the communication may refuse the requested voice call session, while in other cases the communication may simply indicate that the recipient device supports text messaging as an alternative to voice mail. As a result of the received communication, the initiating device outputs a text input prompt. After receiving text input in response to the prompt, the initiating device sends a text message containing the received text input. At least some additional embodiments include devices and/or systems configured to perform the above-described method and machine-readable media storing instructions for carrying out the above-described method.

DETAILED DESCRIPTION

Figure 1:
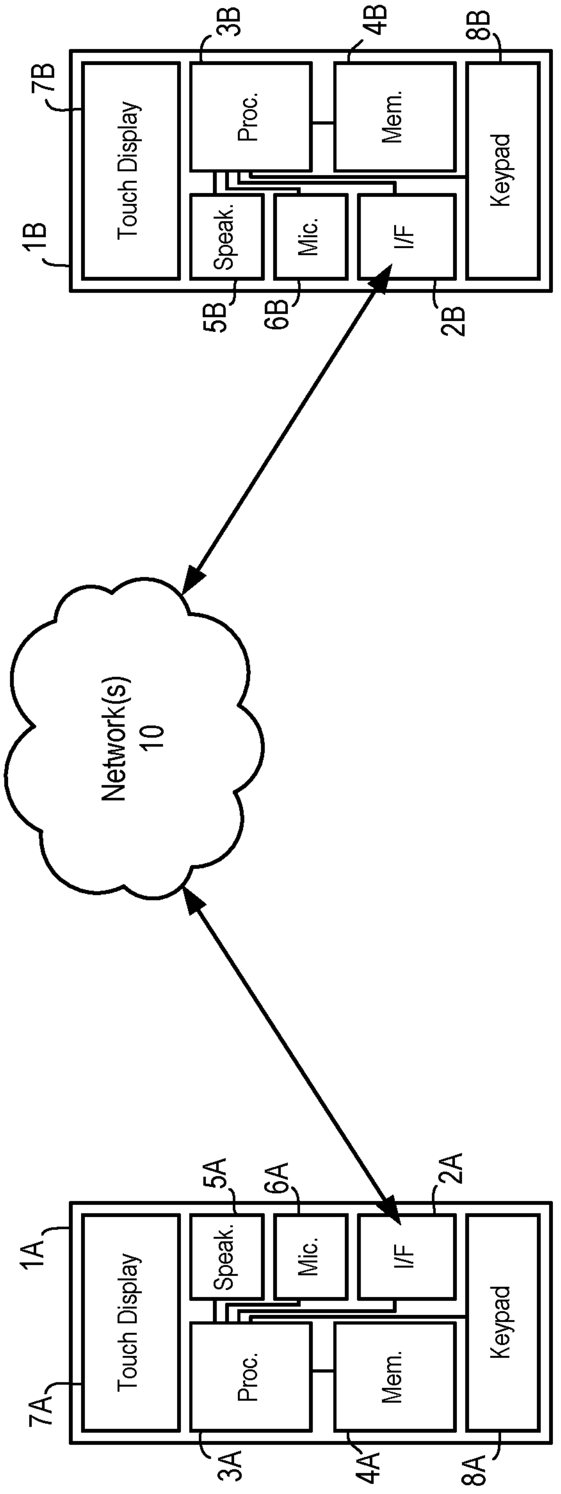
FIG. 1 is a block diagram of a system according to at least some embodiments.

FIG. 1 is a block diagram of a system according to at least some embodiments. The system of FIG. 1 includes a first communication terminal 1A and a second communication terminal 1B that are configured for communication with one another via network(s) 10. Network(s) 10 may include a first access network with which terminal 1A directly communicates using a hardware interface 2A, a second access network with which terminal 1B communicates directly using a hardware interface 2B, and one or more intermediate data networks that interconnect the first and second access networks.

In the example of FIG. 1, each of terminals 1A and 1B is a wireless mobile terminal that provides telephony communications via a wide area wireless access network. Examples of such wide area wireless networks include but are not limited to cellular telephone networks, third generation (3G) mobile networking and telecommunication networks, EDGE (Enhanced Data rate for GSM Evolution) networks, and EVDO (Evolution Data Optimized) networks. Accordingly, each of hardware interfaces 2A and 2B may include a transceiver configured for direct communication with the corresponding wide area wireless access network, and each of terminals 1A and 1B may be configured to communicate with the corresponding wide area wireless access network using the appropriate wireless access network protocols. That configuration, as well as any configuration to carry out other operations as described below, can be physically embodied in the form of instructions (e.g., executable code and/or hard-wired logic) stored in the processor (3A, 3B) and/or memory (4A, 4B) of each terminal.

In embodiments where each of terminals 1A and 1B communicates directly with a separate wide area wireless access network, terminals 1A and 1B need not directly communicate with the same type of access network. For example, terminal 1A could communicate directly with a 3G network and terminal 1B could communicate directly with an EVDO network. In some embodiments, terminals 1A and 1B may each communicate directly with a common access network.

Although certain embodiments include two terminals that communicate directly with one or more wide area wireless access networks, this is only one example. In other embodiments, one or both of terminals 1A and 1B is another type of communication device and communicates directly with a different type of access network. For example, terminal 1A and/or terminal 1B could be a computer, a set top terminal, or some other type of communication device that communicates directly with a wired access network. Examples of wired access networks include but are not limited to a hybrid fiber coaxial (HFC) network used to deliver telephony, data and other services to a premises over a coaxial drop, a Fiber to the Home (FTTH) network used to deliver telephony, data and other services over a fiber optic link that terminates in a premises, a Digital Subscriber Line (DSL) network delivering telephony, data and other services over a twisted pair conductor that terminates in a premises, etc. In embodiments where terminal 1A communicates directly with a wired access network, hardware interface 2A includes the appropriate components (e.g., a cable modem, an optical network terminal, a DSL modem) for communication over the access network medium and is configured (via instructions stored in processor 3A and/or memory 4A, for example) to communicate with the wired access network using the appropriate protocols. In embodiments where terminal 1B communicates directly with a wired access network, hardware interface 2B similarly may include the appropriate components for communication over that access network medium and is configured to communicate with that access network using the appropriate protocols.

In still other embodiments, one or more of terminals 1A and 1B may communicate over a local wireless network link with an in-premises gateway, a femtocell or other device. That gateway, femtocell or other device then relays communications from and to the terminal over an access network link. In some embodiments, for example, terminal 1A may be a Digital Enhanced Cordless Telephone (DECT) handset or some other type of local wireless network device. In such embodiments, hardware interface 2A may include a short-range wireless transceiver for communication with a corresponding transceiver in a gateway (or other relaying device) and may be configured (via instructions stored in processor 3A and/or memory 4A, for example) to communicate using the appropriate local wireless network protocols. Example types of local wireless networks include but are not limited to DECT networks, WiFi networks according to IEEE 802.11, Cordless Advanced Technology—Internet and Quality (CAT-iq) networks, etc. In embodiments where terminal 1B communicates directly over a local wireless network link, hardware interface 2B similarly includes the appropriate components for communication over that local wireless network and is configured to communicate using the appropriate local wireless network protocols.

In still other embodiments, one or both of terminals 1A and 1B may communicate over a wired local network link with a local gateway, router or other element, and with that other element then relaying communications from and to the terminal over an access network link. Examples of local wired networks include Ethernet networks, Multimedia Over Coax Alliance (MOCA) networks, Digital Living Network Alliance (DLNA) networks, etc. In such embodiments, the terminal hardware interface includes the appropriate hardware (e.g., an Ethernet card, a MOCA chipset, a DLNA chipset) for communication over the local network medium and the terminal is configured (by instructions stored in the processor and/or memory) to communicate using the appropriate local network protocols.

Returning to FIG. 1, the hardware communication interface 2A of terminal 1A receives and demodulates communication signals received over a direct communication link. Interface 2A also modulates and transmits communication signals over that link. As indicated above, terminal 1A includes a processor 3A configured to execute instructions so as to perform various operations as described herein and to control operation of other components of terminal 1A. Those instructions may be stored in memory 4A as executable code and/or as hard wired logic within processor 3A. Memory 4A also stores data sent or received by terminal 1A and other data used in operation of terminal 1A. Processor 3A is also configured to perform one or more types of CODEC (coder/decoder) operations to convert data to audio for output through a speaker 5A and to convert sound received through a microphone 6A into data. Processor 3A outputs video data to a display 7A and receives user input through a keypad 8A and/or through touch sensitive portions of display 7A. Processor 3A is configured to provide a user interface (UI) on display 7A by which a user of terminal 1A can provide text input using keypad 8A and/or touch sensitive portions of display 7A, see text messages and other output, and otherwise receive visual displays of information. A battery or other power supply (not shown) provides electrical power to terminal 1A. Terminal 1B similarly includes a hardware communication interface 2B that receives and demodulates communication signals and that modulates and transmits communication signals, a processor 3B configured to execute instructions (e.g., executable code and/or hard wired logic within processor 3B) so as to perform various operations as described herein and to control operation of other components of terminal 1B, and a memory 4B that stores instructions and data. Processor 3B is also configured to perform one or more types of CODEC operations to output audio through a speaker 5B, to convert sound received through a microphone 6B into data, to output video data to a display 7B, to receive user input through a keypad 8B and/or through touch sensitive portions of display 7B, to provide a UI on display 7B, and to output text messages and other visual displays of information on display 7B. Terminal B may also be powered by a battery or other power supply (not shown).

Terminals 1A and 1B are configured to establish a voice call session with one another. As used herein, "voice call session" refers to a state in which terminal 1A, terminal 1B and the networks linking terminals 1A and 1B have been placed into a condition that permits human users of terminals 1A and 1B to conduct a real-time voice conversation. As used herein, "voice call session" includes full duplex communication sessions that resemble conventional telephony, half-duplex "Push-to-Talk" communication sessions, and other types of sessions in which two users can exchange voice communications in real time. Each of terminals 1A and 1B is also configured to send and receive text messages. As used herein, "text message" refers to a text-based message according to Short Message Service (SMS) protocol, a text and multimedia message according to Multimedia Messaging Service (MMS) protocol, an Instant Message (IM), or some other type of scheme that permits text-based communication. In some circumstances, a user of terminal 1A may seek to establish a voice call session with terminal 1B when the user of terminal 1B does not wish (or is not able) to conduct a voice conversation. Although the terminal 1B user could simply ignore a call session request from terminal 1A (e.g., not answer the incoming call request) or could allow that incoming call request to be directed to a voice mail system, neither of these options may be desirable. For example, the user of terminal 1B could be in a loud room or other setting in which a voice conversation might be difficult, but in which the terminal 1B user is still able to read and/or send text messages. Accordingly, terminals 1A and 1B are also configured so that a user of one terminal can specify that another terminal, requesting a voice call session, should be requested or instructed to instead send a text message. The terminals are also configured such that the user of one terminal, when instructing or requesting the other terminal to send a text message, may add a text message to the instruction or request.

Figure 2:
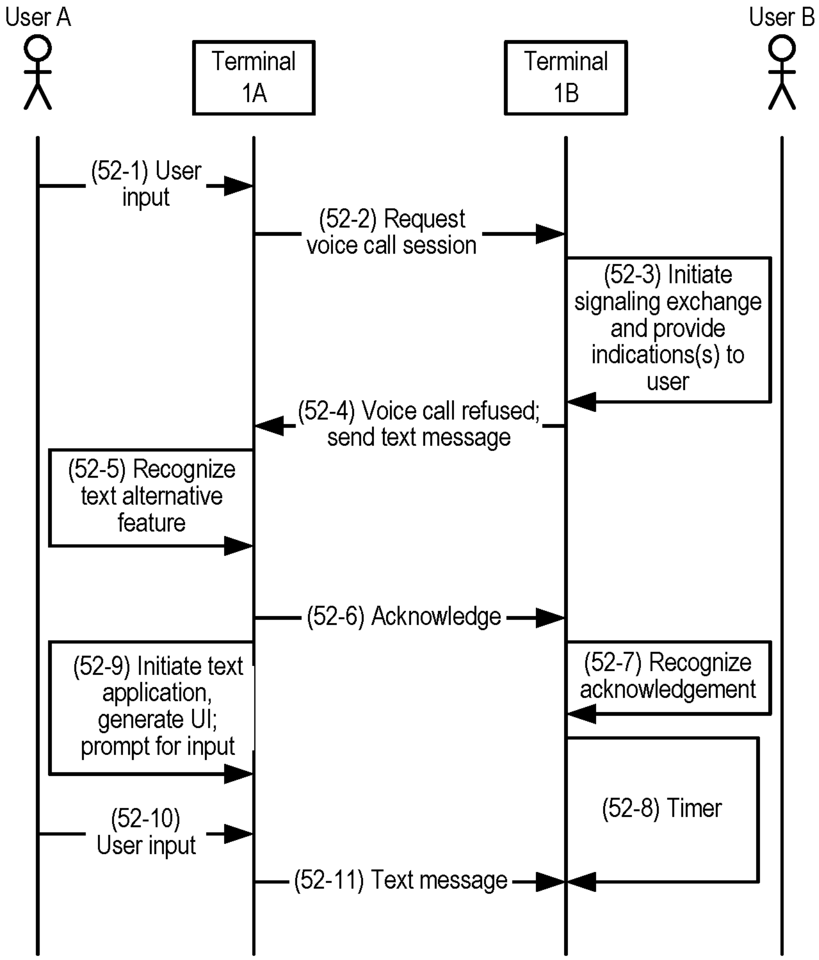
FIGS. 2 through 7 are communication diagrams showing text-based messaging alternatives to voice mail according to at least some embodiments.
Figure 3:
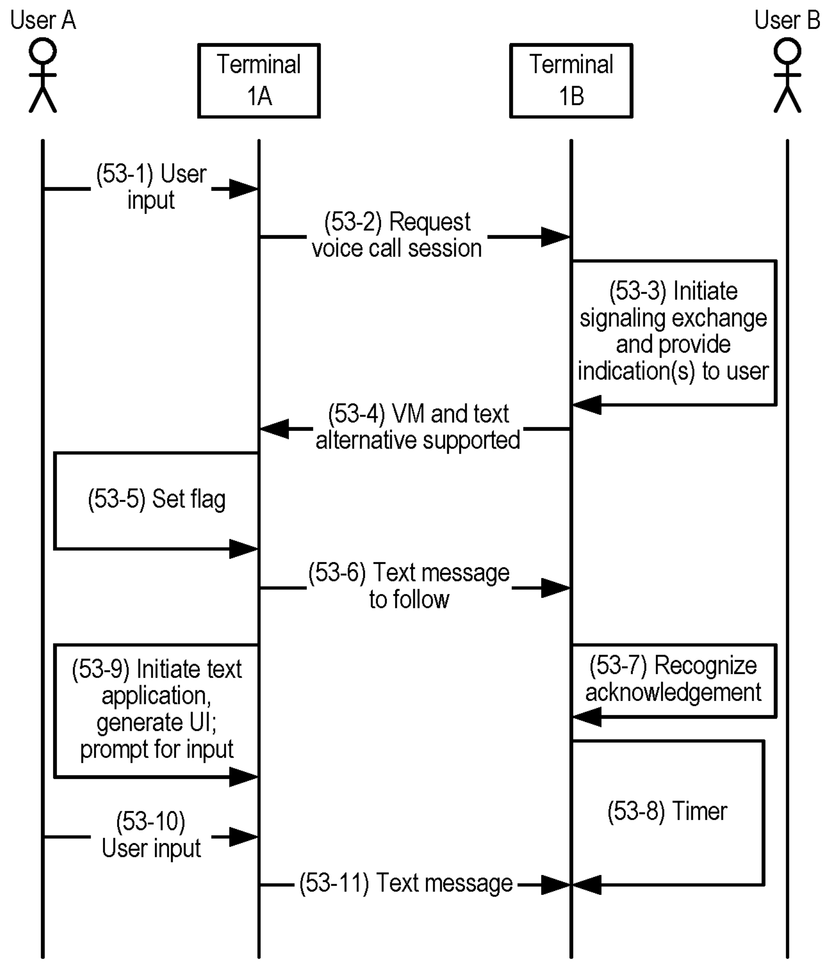

FIGS. 2 and 3 are communication diagrams showing messaging according to at least some embodiments. In the embodiments of FIGS. 2 and 3, each of terminals 1A and 1B supports a "text alternative to voice mail" (hereinafter, "text alternative") feature. That text alternative feature permits a terminal attempting to initiate a voice call session ("initiating terminal") to provide and/or receive a text message if the requested session is not established. In the example of FIG. 2, user B of terminal 1B has enabled the text alternative feature. In this manner, for example, user B has indicated a desire that other users requesting a voice call session with user B send a text message instead. User A of terminal 1A has also enabled the text alternative feature. Alternatively, such features may be automatically enabled. At line 52-1, user A of terminal 1A initiates a request for voice call session with user B. In the embodiment of FIG. 1, user A may do so by inputting an identifier (e.g., a telephone number) associated with terminal 1B and an instruction to begin the voice call session setup process (e.g., by pressing a "call" button after inputting a telephone number). In some embodiments, an identifier may be associated with a user instead of a specific device. For example, a network may associate a particular telephone number or other identifier with a specific user, but that user may be able to receive communications through multiple devices. The network may then track which of those devices is associated with the user at any given time and may route communications to that device or devices.

In response to the user input of line 52-1, terminal 1A transmits a call request communication at line 52-2. For simplicity, FIG. 2 shows this and other communications going directly from terminal 1A to terminal 1B. Other drawing figures similarly show direct communications between an initiating and recipient terminal or between a terminal and another network element. In practice, communications between terminals 1A and 1B (or between terminals and other network elements) could pass through various intermediate elements of network(s) 10. In some cases an intermediate element may simply re-encapsulate and/or relay a communication, while in other cases an intermediate element may add or remove data or otherwise modify a communication before sending that communication to another element. As used herein, "communication" does not require that data be sent in a continuous stream. For example, data packets of a first communication could be intermingled with data packets of an unrelated second communication, with first communication packets identified and reassembled at a destination.

After receiving the communication of line 52-2, terminal 1B exchanges one or more signaling communications with terminal 1A (line 52-3) as part of a signaling exchange. In other words, terminals 1A and 1B and network(s) 10 are configured to permit data exchange between (or with regard to) terminals 1A and 1B, but a voice call session is not established. During the signaling exchange, users A and B cannot speak with each other using terminals 1A and 1B. However, terminal 1A may output an audio signal through speaker 5A or other indicator that the recipient terminal is "ringing," and terminal 1B may provide an audio, visual and/or tactile (e.g., vibration) indicator of the received request for a voice call session. Because the text response feature has been enabled, however, terminal 1B automatically, or after an additional input from user B, sends a communication to terminal 1A indicating that the request for a voice call session is refused and that the initiating terminal should send a text message (line 52-4). Such communication to terminal 1A may be via (or may otherwise include) a text message, and/or may include other types of data that can be output to the user of terminal 1A (e.g., a pre-recorded voice message, a picture or other graphic, etc.). Upon receiving the communication of line 52-4, terminal 1A recognizes that the recipient terminal (and/or its user) has refused the request for a voice call session and has requested a text message (line 52-5). As a result, terminal 1A may then send a communication to terminal 1B at line 52-6 acknowledging receipt of the communication of line 52-4. In response, terminal 1B recognizes (at line 52-7) that the initiating terminal understood the communication of line 52-4 and may be planning to send a text message. In the exemplary embodiment of FIG. 2, terminal 1B may start a timer having a predetermined period at line 52-8. If terminal 1B does not receive a text message from terminal 1A before the elapse of the predetermined period, terminal 1B will store data indicating to user B that the request of line 52-2 was a missed call. If a text message from terminal 1A is received before the elapse of the predetermined period, missed call data is not stored.

Also as a result of the communication of line 52-4, and as shown by line 52-9, terminal 1A may initiate a text messaging application program, generate a user interface on display 7A, and prompt user A to provide text input. If a text messaging application is already running in the background, terminal 1A may simply bring that running application to the foreground. User A provides input to the text messaging application and an instruction (e.g., a "send" command) at line 52-10. As a result, and as shown by line 52-11, terminal 1A transmits a message to terminal 1B containing the text input at line 52-10. In some embodiments, the terminal 1A-terminal 1B signaling exchange remains active until a text message is received or the predetermined time period expires, while in other embodiments that signaling exchange may be terminated earlier (e.g., upon receipt of the acknowledgment message of line 52-6).

User B need not indicate in advance how incoming voice call session requests should be processed. If the text alternative feature of terminal 1B is not enabled prior to receipt of a voice call session request, terminal 1B could simply provide a choice of options to user B. Upon receiving a voice call session request under such circumstances, terminal 1B could provide audio, video and/or tactile indicators of the incoming request and, for example, provide a UI with "answer," "voice mail," "text mail," "end," "reject" or other options. If user B selects the "answer" option, a voice call session could be set up. If user B selects the "voice mail" option, the initiating party could be directed to a voice mail system. If user B selects the "text mail" option, terminal 1B could send the signal of line 52-4. If user B selects the "end" option, a message could be sent to inform the initiating terminal that a voice call session will not be established, but giving the initiating terminal the choice of leaving a voice mail message or of sending a text message. If user B selects the "reject" option, a message may be sent indicating that a voice call session will not be established, and the initiating terminal is not given the option of leaving a voice mail message or of sending a text message.

FIG. 3 is another communication diagram showing some embodiments. In the example of FIG. 3, terminal 1A has enabled the text alternative feature. However, terminal 1B has not enabled the text alternative feature. Accordingly, and as indicated above, user B may be provided multiple options in response to an incoming request to establish a voice call session.

As in the example of FIG. 2, user A provides input at line 53-1 to initiate a voice call session request and a corresponding communication is sent at line 53-2. As a result of receiving the communication of line 53-2, terminal 1B may initiate a signaling exchange with terminal 1A (line 53-3). Although the text alternative feature has not been enabled for terminal 1B, terminal 1B does not automatically refuse the voice call session request. Instead, and as part of line 53-3, terminal 1B outputs audio, visual and/or tactile indicators of the call request and may generate a UI providing user B with various response options (e.g., "answer," "text mail," "voice mail," "end," "reject"). While terminal 1B is providing the indicator(s) of the incoming request, it may send a communication to terminal 1A indicating that terminal 1B supports voice mail and the text alternative feature (line 53-4). If user B provides an input indicating a desire to establish a voice call session (e.g., an "answer" command) while terminal 1B is outputting the aforementioned audio, visual and/or tactile indicators of the call request, the voice call session is established. If user B provides an input indicating a refusal of the call and a desire to receive a text message (e.g., a "text mail" command) while terminal 1B is outputting the aforementioned audio, visual and/or tactile indicators of the call request, terminal 1B could send a communication similar to that of line 52-4 of FIG. 2. If user B provides an input refusing the call and indicating a desire to receive a voice mail (e.g., disabling the text alternative feature), terminal 1B could send a communication indicating that a text message response option is no longer available and directing the initiating party to voice mail. If user B takes no action, the initiating party will be automatically directed to voice mail unless the initiating party takes (or has already taken) some other action.

Such other action by the initiating party may include opting to send a text message. Specifically, upon receiving the message of line 53-4, terminal 1A recognizes that the recipient terminal supports voice mail and text alternative options. If the text alternative feature had not already been enabled on terminal 1A, or if a text alternative preference in terminal 1A had not otherwise been pre-configured, terminal 1A could prompt user A to indicate which action should be taken if a voice call session is not established (e.g., if the recipient user does not accept the voice call session request) within a predetermined amount of time. That prompt may include a visual UI (e.g., a screen display with "leave voice mail" and/or "send text message" options) and/or an audio menu (e.g., a prerecorded message instructing a user to press 1 for voice mail, press 2 to send a text message).

When the text alternative feature has already been enabled in terminal 1A, terminal 1A will automatically prompt user A to send a text message if a voice call session is not established. As shown by line 53-5, upon recognizing that the recipient terminal supports the text alternative feature, terminal 1A may set a flag that indicates a text message should be sent if the requested voice call session is not established. In particular, if the voice call session is not established (e.g., user B fails to accept the request) before expiration of a predefined time period, terminal 1A will initiate the text message application (or bring it to the foreground if previously initiated) and prompt for input. The predefined time period, if used, could be set at terminal 1A or could be set at terminal 1B and provided in the communication of line 53-4. Similarly, the text message application could be initiated (or brought to the foreground) and user A prompted for input if user A provides a further input indicating a desire to proceed with a text message instead of waiting for the recipient terminal to answer.

When the predefined time period expires, terminal 1A may send a communication indicating a text message will be sent (line 53-6). The communication of line 53-6 would also be sent if user A provided the above-described further input, indicating a desire to proceed with a text message. As a result of the communication of line 53-6, and as shown by lines 53-7 through 53-11, operations similar to those described in connection with lines 52-7 through 52-11 of FIG. 2 are performed.

If terminal 1A has the text alternative feature enabled and attempts to establish a voice call session with a terminal that does not support the text alternative feature, terminal 1A would not receive a communication (such as that of line 53-4 of FIG. 3) indicating the recipient terminal supports the feature. In such a case, and assuming the recipient terminal has voice mail capability, terminal 1A could simply allow user A to proceed to the recipient terminal's voicemail if a voice call session is not established.

Figure 4:
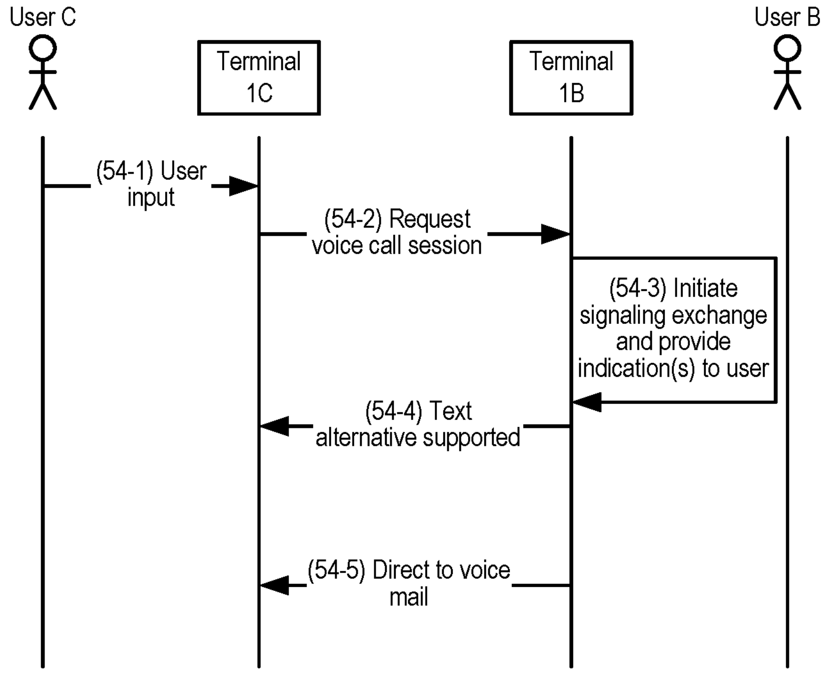

FIG. 4 is a diagram showing exemplary communications between terminal 1B and another terminal (1C) that does not support the text alternative feature. In response to user C input at line 54-1, terminal 1C transmits a call request communication at line 54-2. Terminal 1B may initiate a signaling exchange with terminal 1C (line 54-3) and automatically send a communication to terminal 1C indicating that the request for a voice call session is refused and that the initiating terminal should send a text message (line 54-4). Terminal 1C does not recognize the communication of line 54-4, and may not respond. In some embodiments, the communication of line 54-4 may be repeated one or more times. After failing to receive an acknowledgement or other responsive communication (as in line 52-6 of FIG. 2) after a predefined period, terminal 1B may send a communication indicating the call request has been directed to voice mail (line 54-5). If user C desires to do so, he or she then provides a voice mail message (not shown).

In certain embodiments, an initiating terminal may be configured to indicate, in a voice call session request communication, whether that initiating terminal supports a text alternative feature. In such embodiments, a recipient terminal (or network element acting on behalf of a recipient terminal) could then simply determine from that request whether to send a communication such as in line 54-4, line 53-4 (FIG. 3) or line 52-4 (FIG. 2), or otherwise send a request for a text message.

Figure 5:
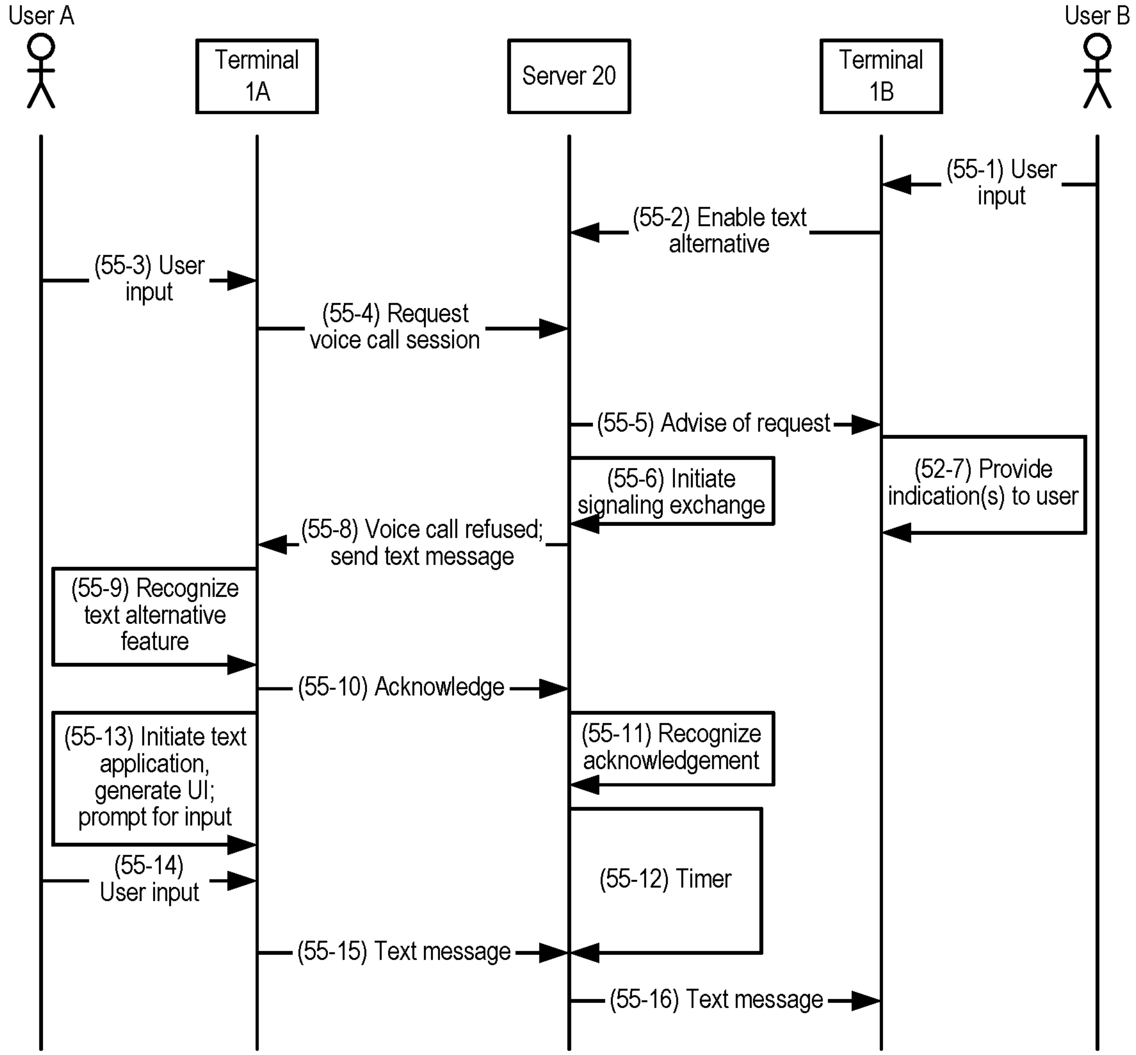
Figure 6:
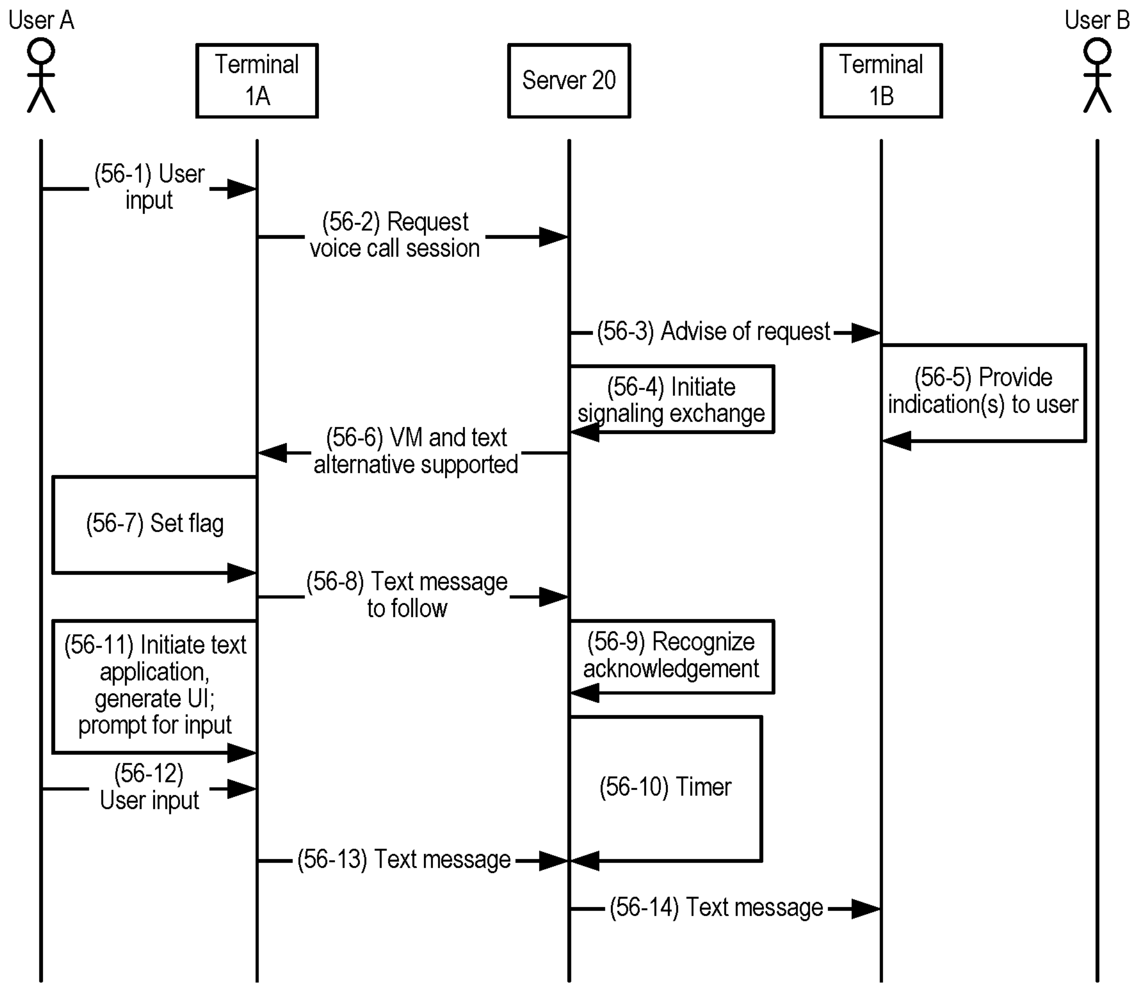
Figure 7:
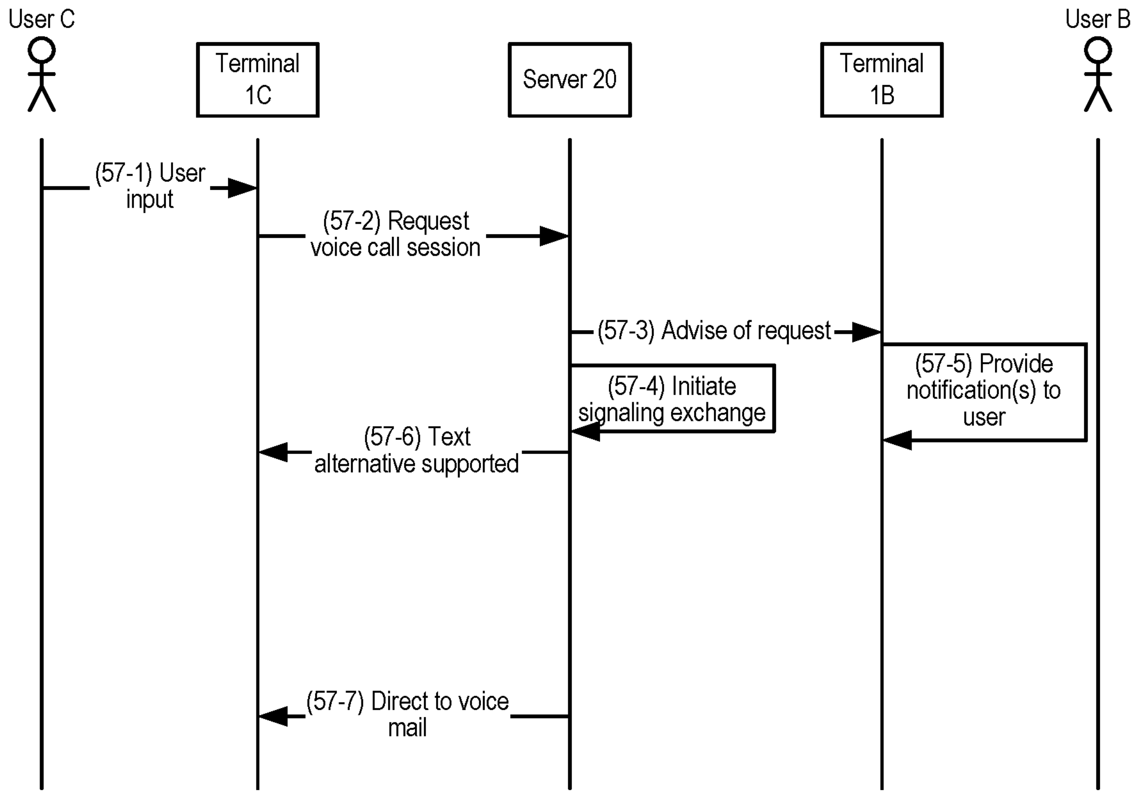

In some embodiments, one or more of the operations performed by terminal 1B, such as operations in the sequences of FIGS. 2-4, could be performed by a call server or other element in network(s) 10 (see FIG. 1). FIG. 5 is an exemplary communication diagram showing a text alternative feature according to at least some such embodiments. As in the embodiments of FIG. 2, terminals 1A and 1B each supports the text alternative feature. In the embodiments of FIGS. 5-7, however, various aspects of the text alternative feature are performed on behalf of a terminal by a server 20 within network(s) 10. Although not shown in the drawings, server 20 could be implemented in a computer having processor(s), memory(ies) and one or more network communication interfaces, with server 20 being configured to execute instructions (hardwired and/or stored as executable code on any appropriate medium) to carry out the operations of server 20 described herein.

At line 55-1, user B provides input to terminal 1B activating the text alternative feature. As a result, terminal 1B sends a communication to server 20 indicating that incoming voice call session requests should be refused and handled in accordance with the text alternative feature. Subsequently, user A provides input to terminal 1A (line 55-3) and causes a voice call session request communication to be sent (line 55-4). The operations of lines 55-3 and 55-4 of FIG. 5 are similar to the operations of lines 52-1 and 52-2 of FIG. 2, but with the communication of line 55-4 going to server 20 instead of to terminal 1B (as is the case with operation 55-2 in FIG. 2). As a result of the communication of line 55-4, server 20 sends a communication to terminal 1B advising of the incoming call request (line 55-5) and initiates a signaling exchange with terminal 1A (line 55-6). As a result of the communication of line 55-5, terminal 1B provides a notification of the call request and, for example, any type of UI permitting user B to override the previous enablement of the text alternative feature (line 55-7).

Also as a result of communication 55-4, server 20 sends a communication at line 55-8 indicating that the request for a voice call session is refused and that the initiating terminal should instead send a text message. The communication of line 55-8 is similar to the communication of line 52-4 of FIG. 2. As a result of the communication at line 55-8, the operations of lines 55-9 through 55-15 are performed. The operations of lines 55-9 through 55-15 are similar to the operations of lines 52-5 through 52-11 of FIG. 2, but with server 20 taking the place of terminal 1B. After receiving the text message of line 55-15, server 20 forwards that text message to terminal 1B at line 55-16.

FIG. 6 is an exemplary diagram of communications where server 20 performs certain operations instead of terminal 1B. As with the sequence of FIG. 3, terminal 1A has enabled the text response feature, but terminal 1B has not. User A provides input to terminal 1A (line 56-1) and causes a voice call session request communication to be sent (line 56-2). The operations of lines 56-1 and 56-2 of FIG. 6 are similar to the operations of lines 53-1 and 53-2 of FIG. 3, but with the communication of line 56-2 going to server 20 instead of to terminal 1B (as is the case with operation 53-2 of FIG. 3). As a result of the communication of line 56-2, server 20 sends a communication to terminal 1B advising of the incoming request (line 56-3) and initiates a signaling exchange with terminal 1A (line 56-4). As a result of the communication of line 56-3, and as shown by line 56-5, terminal 1B outputs audio, visual and/or tactile indicators of the incoming request.

Also as a result of the communication at line 56-2, server 20 sends a communication at line 56-6 indicating that terminal 1B supports the text alternative feature and, if desired, other features such as voice mail. The communication of line 56-6 is similar to the communication of line 53-4 of FIG. 3, but going from server 20 instead of from terminal 1B (as is the case with operation 53-4 of FIG. 3). As a result of the communication at line 56-6, the operations of lines 56-7 through 56-13 may be performed. The operations of lines 56-7 through 56-13 are similar to the operations of lines 53-5 through 53-11 of FIG. 3, but with server 20 taking the place of terminal 1B. After receiving the text message at line 56-13, server 20 forwards the message to terminal 1B at line 56-14.

Alternatively, and as with the embodiment of FIG. 3, the user of terminal 1B could have provided an input accepting the voice call session request in response to the indication(s) of line 56-5. Had user B done so, the voice call session would have been established. Similarly, user B could have provided an input indicating a refusal of the call and a desire to receive a text message (e.g., a "text mail" command). In response to such an input, terminal 1B would have sent a communication to server 20 that would have caused server 20 to send an appropriate communication to terminal 1A, similar to that of line 55-8 of FIG. 5. If user B had provided an input refusing the call and indicating a desire to receive a voice mail (e.g., disabling the text response feature), terminal 1B could have sent a communication to server 20 indicating that a text message response option is no longer available and directing the initiating party to voice mail, with server 20 then sending a corresponding communication to terminal 1A.

FIG. 7 is an exemplary diagram of communications where server 20 performs certain operations instead of terminal 1B. As with the sequence of FIG. 4, terminal 1B has enabled the text alternative feature (not shown in FIG. 7), but terminal 1C does not support that feature. The operations of lines 57-1 and 57-2 are similar to the operations of lines 54-1 and 54-2 of FIG. 4, but with communication 57-2 going to server 20 instead of terminal 1B. The operations of lines 57-3 through 57-6 are similar to the operations of lines 55-5 through 55-8, respectively, of FIG. 5. The communication of line 57-7 is similar the communication of line 54-5 of FIG. 4, except that it comes from server 20 instead of terminal 1B.

Figure 8:
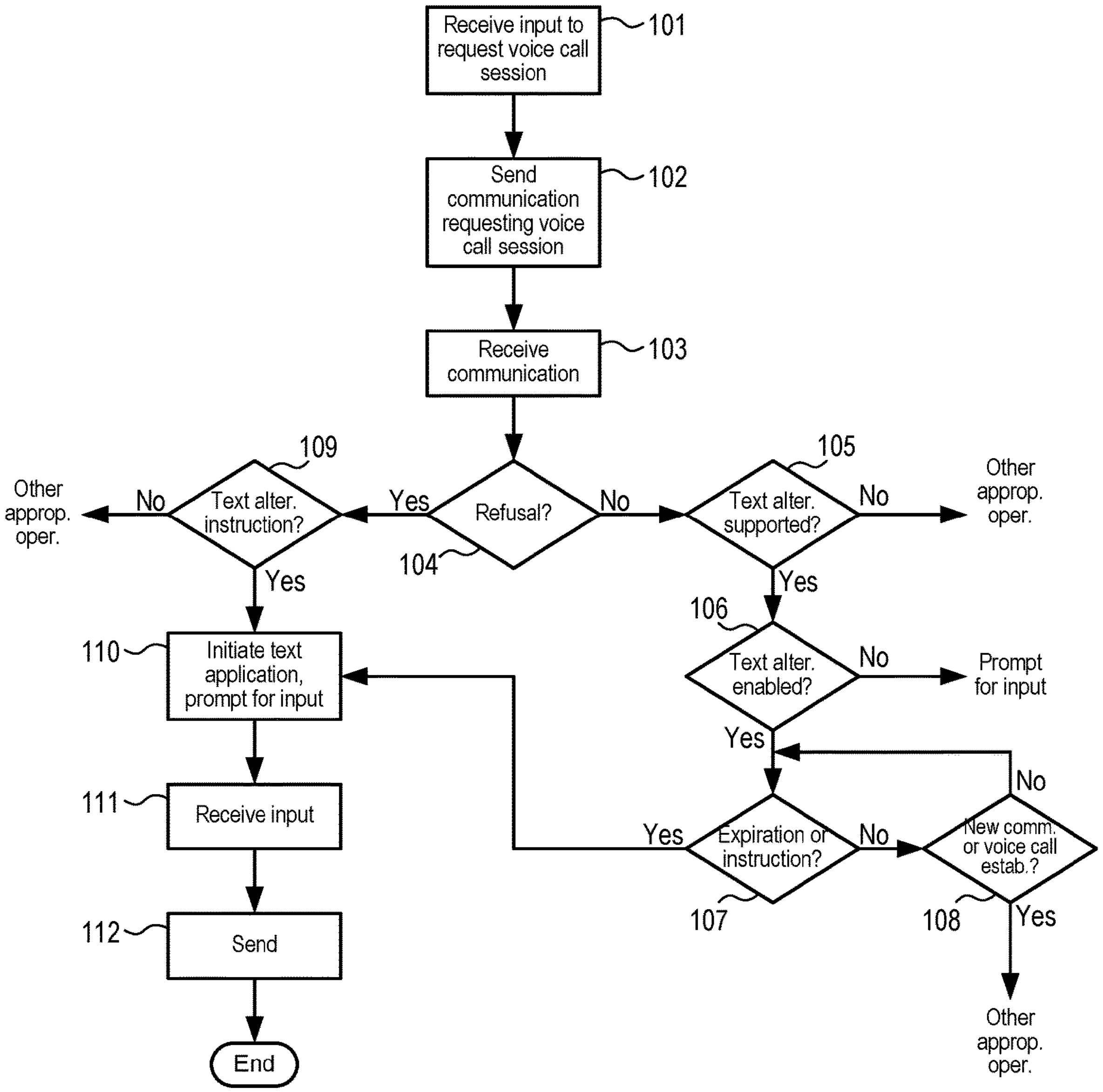
FIG. 8 is a flow chart showing operations performed by an initiating terminal that supports a text alternative feature according to at least some embodiments.

FIG. 8 is a flow chart illustrating an exemplary process and showing operations performed by an initiating terminal that supports a text alternative feature (e.g., terminal 1A) according to at least some embodiments. Although the operations shown in the process of FIG. 8 may be performed by an initiating terminal as part of the communication sequences shown in FIGS. 2-7, the communication sequences of FIGS. 2-7 could also be performed by an initiating terminal performing operations according to a process other than that reflected by FIG. 8. A person of ordinary skill will also appreciate that operations represented by certain blocks of FIG. 8 could be performed by other devices, such as server 20.

At block 101, the initiating terminal receives user input indicating that a voice call session should be requested. After receiving that input, the terminal sends a communication requesting a voice call session (block 102). Subsequently, the terminal receives a communication in response to the voice call session request (block 103). The terminal then, at block 104, determines if the communication received in block 103 is a refusal of the requested voice call session. If not, the process continues on the "no" branch to block 105. In block 105, the initiating terminal may determine, based on data included in the communication received in block 103, whether the recipient terminal supports the text alternative feature. If the recipient terminal supports the text alternative feature, for example, the initiating terminal may have more options (e.g., text messaging) if a voice call session is not established. Conversely, a determination that the recipient terminal does not support the text alternative feature may indicate that such additional options are not available.

If the initiating terminal determines in block 105 that the recipient terminal does not support the text alternative feature, the initiating terminal continues on the "no" branch from block 105 to perform additional operations. Such additional operations can include, e.g., waiting for the recipient terminal to accept the request, commencing the voice call session if the request is accepted, waiting for a signal indicative of voice mail, etc. If the text alternative feature is supported by the recipient terminal, the process continues on the "yes" branch to block 106.

In block 106, the initiating terminal determines if the text alternative feature has been enabled in the initiating terminal, or if the preferences of the initiating terminal are otherwise preconfigured to select the text alternative when available. For example, a user of the initiating terminal may have determined that he or she does not desire one or more of the text alternative feature options to be automatically executed if a voice call session request with a recipient terminal cannot be established, and thus may have disabled the text alternative feature in the initiating terminal. If the text alternative feature is not enabled in the initiating terminal, the process continues on the "no" branch from block 106 and may perform other operations. For example, and as described above, the initiating terminal can prompt its user to indicate which action (e.g., send text message or leave voice mail) should be taken if a voice call session is not established within a predetermined amount of time. If the text alternative feature is enabled (or a text message preference has otherwise been set), the process continues on the "yes" branch from block 106 to block 107. In block 107, the initiating terminal determines if a predetermined time has expired or if the initiating terminal user has provided a further input indicating that the user does not wish to wait any longer for the recipient party to answer. As previously indicated in connection with FIG. 3, this predetermined time period could be set at the initiating terminal or at the recipient terminal. If the predetermined time has expired (or if there is a received instruction indicating that the initiating terminal user does not wish to wait any longer for the recipient party to answer), the process continues on the "yes" branch to block 110, discussed below. If the predetermined time has not expired and an instruction has not been received, the process continues on the "no" branch to block 108. In block 108, the terminal determines if the voice call session has been established or if a new communication has been received. For example, a subsequent communication from the recipient terminal could indicate the text alternative feature is no longer available. If so, the process continues on the "yes" branch from block 108 and other appropriate operations are performed. If not, the process loops from the "no" branch of block 108 back to block 107.

Returning to block 104, if the message received in block 103 refused the request for a voice call session, the process proceeds on the "yes" branch to block 109. In block 109, the initiating terminal determines if the received message also includes an instruction to send a text message. If not, the process continues on the "no" branch and other appropriate operations (e.g., connection to a voice mail system) may be performed. If the received message includes an instruction to send a text message, the process continues on the "yes" branch from block 109 to block 110. In block 110, the initiating terminal initiates a text messaging application (or brings an active application to the foreground) and prompts the user for input. After receiving that input at block 111, the message is sent at block 112, after which the process ends.

In some embodiments, if at any time the initiating terminal receives a communication from (or on behalf of, e.g., from a server) the recipient terminal indicating that the voice call session request has been rejected, the process of FIG. 8 terminates and the initiating terminal simply outputs a notification that the voice call session request has failed.

Figure 9:
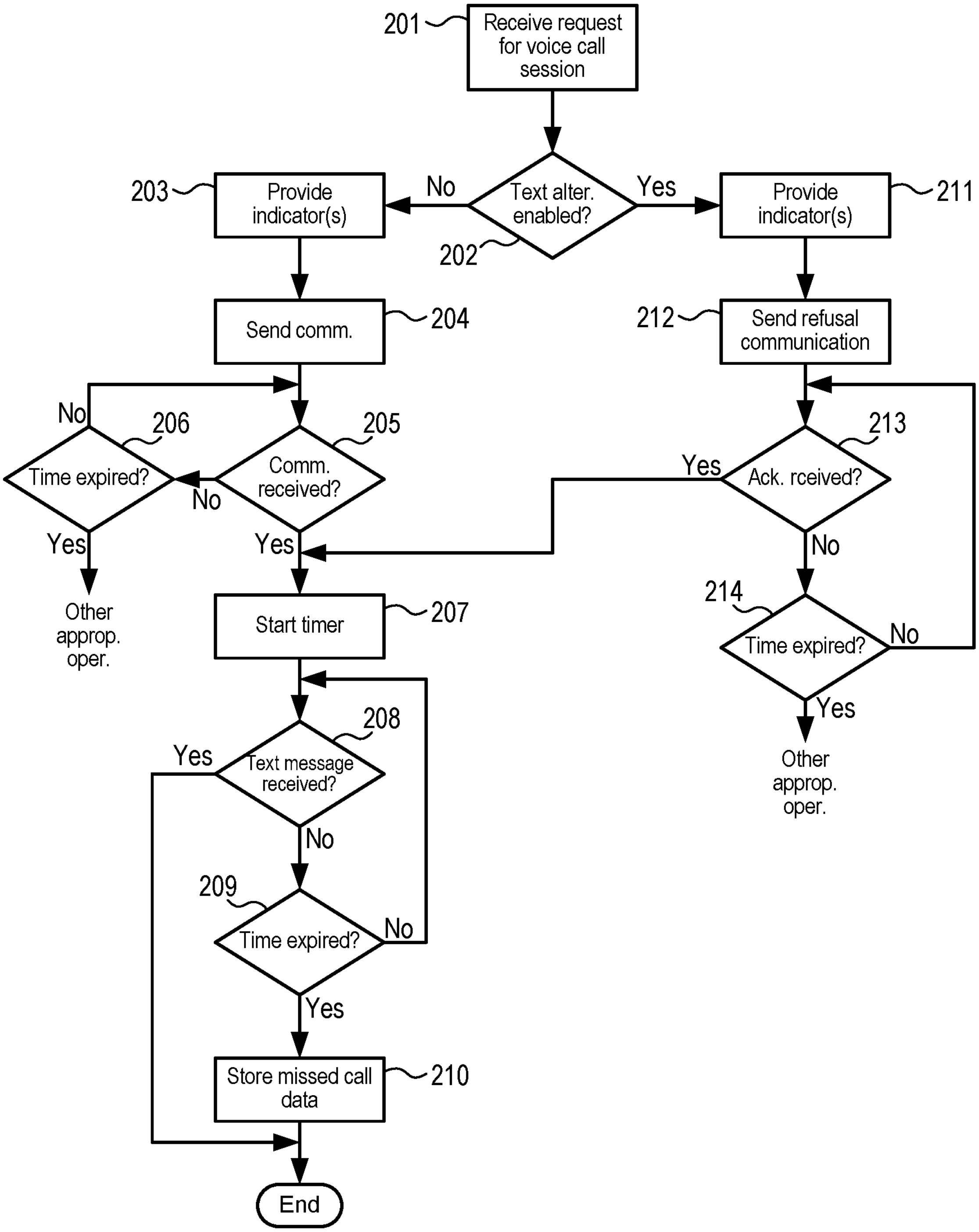
FIG. 9 is a flow chart showing operations performed by a recipient terminal that supports a text alternative feature according to at least some embodiments.

FIG. 9 is a flow chart illustrating an exemplary process and showing operations performed by a recipient terminal that supports a text alternative feature (e.g., terminal 1B) according to at least some embodiments. Although the operations shown in FIG. 9 may be performed by recipient terminal as part of the communication sequences shown in FIGS. 2-7, the communication sequences of FIGS. 2-7 could also be performed by a recipient terminal performing operations according to a process other than that reflected by FIG. 9.

FIG. 9 shows operations that could, for example, be performed by a recipient terminal in embodiments such as were described in connection with FIGS. 2-4. A person of ordinary skill will readily appreciate, however, that operations represented by certain blocks of FIG. 9 could be performed by other devices, such as server 20.

At block 201, the recipient terminal receives a communication requesting establishment of a voice call session. The process then proceeds to block 202 and the recipient terminal determines if the text alternative feature is enabled. If not, the process proceeds on the "no" branch to block 203. In block 203, the terminal provides indicators of the incoming call request and allows initiation of a signaling exchange with the initiating terminal. The indicators of the incoming call request could include audio indicators (e.g., ringtones), visual indicators (e.g., graphical indicia on a device display) and/or tactile indicators (e.g., vibrations) provided to the recipient terminal user of the incoming call session request. The process then proceeds to block 204, where the recipient terminal sends a communication (e.g., to the initiating terminal or to a server) indicating that the text alternative feature is supported. The process then proceeds to block 205 and the recipient terminal determines if another communication from the initiating terminal acknowledging the text alternative has been received. If not, the process continues on the "no" branch to block 206 and the recipient terminal determines if a predetermined time period (e.g., the maximum amount of time the recipient terminal is permitted to "ring") has expired. If that predetermined time has expired, the process continues on the "yes" branch from block 206 and the recipient terminal may perform other appropriate operations (e.g., directing the caller to voice mail). Otherwise, the process loops back to block 205 on the "no" branch from block 206.

If the recipient terminal determines at block 205 that an acknowledgement communication has been received, the process continues on the "yes" branch to block 207. In block 207, the recipient terminal starts a timer for a predetermined time period that the recipient terminal will wait for a text message. The predetermined time period of block 207 can be the same or different from the predetermined time period of block 206. From block 207, the process proceeds to block 208, where the recipient terminal determines if a text message from the initiating terminal has been received. If so, the process proceeds on the "yes" branch to process conclusion. If not, the process continues on the "no" branch to block 209. In block 209, the terminal determines if the timer started in block 207 has expired. If not, the process loops back to block 208 on the "no" branch. If so, the process continues on the "yes" branch to block 210. In block 210, data is stored indicating the call request is a missed call. From block 210, the process terminates.

Returning to block 202, if the text alternative feature is enabled, flow continues on the "yes" branch to block 211. In block 211, the terminal provides indicators of the incoming call request and allows initiation of a signaling exchange. The process then proceeds to block 212, where the recipient terminal sends a communication refusing the call request and indicating that a text message should be sent. The process then continues to block 213 and the recipient terminal determines if the initiating terminal has sent a communication that acknowledges the communication of block 212. If so, the process continues on the "yes" branch to block 207. If not, the process continues on the "no" branch to block 214, where the recipient terminal determines if a predetermined period has elapsed since sending the communication in block 212. The predetermined period of block 214 can be the same or different than the predetermined periods of block 206 or block 207. If the predetermined time period since block 212 has expired, the process continues on the "yes" branch from block 214 and the recipient terminal performs other appropriate operations (e.g., directing the call request to voice mail). Otherwise, the process returns on the "no" branch from block 214 to block 213.

As indicated above, a recipient terminal may provide various indicators to a recipient terminal user when a request for a voice call session has been received and may provide the recipient terminal user with various options to specify (or to override a prior specification of) how that request can be handled. Although not shown in FIG. 9, a recipient terminal according to some embodiments monitors for certain inputs from the recipient terminal user in a separate program thread. If one of those inputs is received prior to certain points in the process of FIG. 9, for example, the flow of the FIG. 9 process may be altered. Examples of such inputs, parts of the FIG. 9 process when they might be accepted, and the corresponding process alterations are listed in Table 1.

TABLE 1

| user input | when input accepted | process alteration |
|---|---|---|
| answer | If "no" branch from block 202 followed: prior to detecting received communication in block 205. If "yes" branch from block 202 followed: prior to sending communication of block 212. | Process terminates and voice call session established. |
| voice mail | If "no" branch from block 202 followed: prior to detecting received communication in block 205. If "yes" branch from block 202 followed: prior to sending communication of block 212. | Process terminates; init. terminal sent communication directing init. terminal to voice mail system. |
| text mail | If "no" branch from block 202 followed: prior to detecting received communication in block 205. If "yes" branch from block 202 followed: N/A (text mail preference of recipient assumed by enablement of text alternative feature). | If init. terminal known to support text alternative feature, send communication directing init. terminal to send text message, then go to block 207. If not known whether init. terminal supports text alternative feature, send communication directing init. terminal to send text message, then go to block 213. |
| end | If "no" branch from block 202 followed: prior to detecting received communication in block 205. If "yes" branch from block 202 followed: N/A (text mail preference of recipient assumed by enablement of text alternative feature). | Send communication to initiating terminal indicating voice call session will not be established; if no text message or voice mail message received within timeout period, go to block 210. |
| reject | If "no" branch from block 202 followed: prior to detecting received communication in block 205. If "yes" branch from block 202 followed: prior to sending communication of block 212. | Send communication indicating no voice mail session will be established and no voice mail or text message will be accepted. |

User inputs and resulting actions, such as listed in the first and third columns of Table 1, are not limited to embodiments in which the process of FIG. 9 is performed. For example, in embodiments where communication sequences such as in FIGS. 2-7 are performed by recipient terminals performing processes different from that of FIG. 9, similar inputs similar to those in the "user input" column of Table 1 may result in operations similar to those in the "process alteration" column of Table 1.

In some embodiments, a recipient terminal such as terminal 1B could alternatively be configured by a user so that the text alternative feature is disabled, and so that requests for voice call sessions are directed to voice mail regardless of the desires of the initiating terminal user.

In at least some embodiments, and as described above, certain communications can be sent during a signaling exchange when a voice call session has not been established. Examples of such communications can include the communications associated with lines 52-4 and 52-6 (FIG. 2), lines 53-4 and 53-6 (FIG. 3), lines 54-4 and 54-6 (FIG. 4), lines 55-8 and 55-10 (FIG. 5), lines 56-6 and 56-8 (FIG. 6) and lines 57-6 and 57-7 (FIG. 7). In some embodiments one or more other messages can be sent without establishing the voice call session requested by the initiating terminal. For example, a message refusing the requested voice call session and instructing the initiating terminal to send a text message could include a tone and/or voice recording played through the speaker of the initiating terminal. Similarly, a message indicating that the recipient terminal supports the text alternative feature could include a tone or voice recording, played through the initiating terminal speaker, indicating that a text message is preferred to leaving a voice mail. As another example, a prerecorded message from a recipient terminal or other network element could inform the initiating terminal user that said user can press "1" to leave a voice mail or press "2" if the initiating terminal supports the text alternative feature and the user would prefer to send a text message. If the initiating terminal user presses "2", a subsequent communication could be sent to the terminal (or a series of tones played on the terminal) instructing the terminal to initiate a text application, etc.

Although a text message sent as part of a text alternative feature could be sent to the same recipient terminal with which the initiating terminal has requested a voice call session, this need not be the case. In some embodiments, an initiating terminal automatically populates the appropriate field(s) of a text message (e.g., one of the messages of lines 52-11, 53-11, 55-15, 56-13) so as to address that message to the same recipient identifier (e.g., a telephone number of the recipient terminal) used for the voice call session request (lines 52-2, 53-2, 55-4, 56-2). The initiating terminal user is not required to re-enter or otherwise re-specify that identifier for purposes of the text message. In other embodiments, a communication from or on behalf of the recipient terminal (e.g., a communication similar to that of lines 52-4, 53-4, 54-4, 55-8, 56-6 or 57-6) includes a different recipient identifier (e.g., a phone number of a different terminal), which different identifier is then used automatically by the initiating terminal without requiring the initiating terminal user to specify that different identifier. The different identifier could be pre-programmed by the recipient terminal user as part of creating a user profile. Alternatively, the recipient terminal user could provide the different identifier in response to a prompt included when the recipient terminal notifies the user of an incoming voice call session request.

In some embodiments, a text alternative feature could be enabled as part of a presence feature. For example, a wireless terminal could be configured to automatically enable (or request enablement of) the text alternative feature upon roaming to a region associated with a particular cell. As another example, a recipient terminal could be configured to automatically enable the text alternative feature at certain times and/or on certain days. As yet a further example, a recipient terminal could be configured to automatically enable the text alternative feature upon detecting a certain caller identifier (or other information) reflecting who has initiated a voice call session request.

As but another example, a recipient terminal can be configured so that the microphone (e.g., microphone 6B of FIG. 1) periodically samples ambient noise levels. If the ambient noise level exceeds a certain level for a predefined time period, the terminal would then assume it is located in a noisy environment and enable the text alternative feature. As another example, a mobile device having motion sensors could be configured to determine, based on motion levels above a certain level over a certain amount of time, that a user is engaged in jogging or some other activity and that the text alternative feature should be enabled. As a yet another example, a mobile device could be configured to detect WiFi, BLUETOOTH or other types of wireless signals transmitted by a proprietor of a movie theater, church, or other establishment in which use of mobile devices is discouraged. In response to detecting a wireless signal, the recipient terminal could then enable the text alternative feature and disable any preset audible indicators that might otherwise be output in response to an incoming request to establish a voice call session.

In some embodiments, a presence feature can be combined with features of embodiments described in FIGS. 2-7. For example, a recipient terminal could be configured to respond to incoming voice call requests according to FIGS. 2-4 under some circumstances when it is assumed the user is able (or wishes) to be notified of all incoming requests and given the option to provide responsive input to such a notification. In other circumstances, one or more of the operations for responding to incoming voice call session requests could be turned over to a server or other network element in a manner similar to that shown in FIGS. 5-7. Such operations might be turned over if, e.g., the recipient terminal is powered off or if the user has indicated a desire for a network element to assume certain operations.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. The features of the embodiments described herein may be combined in all possible combinations of methods, apparatus, modules, systems, and machine-readable products. Any and all permutations of features from above-described embodiments are the within the scope of the invention.

The invention claimed is:

1. A method comprising:

receiving, by a network element and prior to a first device requesting a voice call session with a second device, presence information for the second device;

determining, based on the first device requesting a first voice call session with the second device and based on the presence information, that the first voice call session has not been established between the first device and the second device; and sending, to the first device, an electronic communication requesting a text message instead of a voicemail.

2. The method of claim 1, wherein the presence information comprises at least one of:

a location of the second device;

a day or time;

one or more caller identities; or an activity level associated with the second device.

3. The method of claim 1, further comprising:

receiving, by the network element and from the first device, a request for the first voice call session; and sending, by the network element and to the second device, the request for the first voice call session.

4. The method of claim 1, further comprising:

receiving, by the network element and based on the presence information, a first text message indicating a request, from the first device, for a second voice call session; and sending, to the second device, the first text message.

5. The method of claim 1, wherein the determining that the first voice call session has not been established between the first device and the second device is further based on receiving, from the second device, an indication of refusal for the first voice call session.

6. The method of claim 1, further comprising:

receiving, from the first device and after sending the electronic communication, a first text message intended for the second device; and sending, to the second device, the first text message.

7. A network element comprising:

one or more processors; and memory storing instructions that, when executed by the one or more processors, cause the network element to:

receive, prior to a first device requesting a voice call session with a second device, presence information for the second device;

determine, based on the first device requesting a first voice call session with the second device and based on the presence information, that the first voice call session has not been established between the first device and the second device; and send, to the first device, an electronic communication requesting a text message instead of a voicemail.

8. The network element of claim 7, wherein the presence information comprises at least one of:

a location of the second device;

a day or time;

one or more caller identities; or an activity level associated with the second device.

9. The network element of claim 7, wherein the instructions, when executed by the one or more processors, cause the network element to:

receive, from the first device, a request for the first voice call session; and send, to the second device, the request for the first voice call session.

10. The network element of claim 7, wherein the instructions, when executed by the one or more processors, cause the network element to:

receive, based on the presence information, a first text message indicating a request, from the first device, for a second voice call session; and send, to the second device, the first text message.

11. The network element of claim 7, wherein the instructions, when executed by the one or more processors, cause the network element to determine that the first voice call session has not been established between the first device and the second device further based on receiving, from the second device, an indication of refusal for the first voice call session.

12. The network element of claim 7, wherein the instructions, when executed by the one or more processors, cause the network element to:

receive, from the first device and after sending the electronic communication, a first text message intended for the second device; and send, to the second device, the first text message.

13. A non-transitory computer-readable medium comprising instructions that, when executed, cause a network element to:

receive, prior to a first device requesting a voice call session with a second device, presence information for the second device;

determine, based on the first device requesting a first voice call session with the second device and based on the presence information, that the first voice call session has not been established between the first device and the second device; and send, to the first device, an electronic communication requesting a text message instead of a voicemail.

14. The non-transitory computer-readable medium of claim 13, wherein the presence information comprises at least one of:

a location of the second device;

a day or time;

one or more caller identities; or an activity level associated with the second device.

15. The non-transitory computer-readable medium of claim 13, wherein the instructions, when executed, cause the network element to:

receive, from the first device, a request for the first voice call session; and send, to the second device, the request for the first voice call session.

16. The non-transitory computer-readable medium of claim 13, wherein the instructions, when executed, cause the network element to:

receive, based on the presence information, a first text message indicating a request, from the first device, for a second voice call session; and send, to the second device, the first text message.

17. The non-transitory computer-readable medium of claim 13, wherein the instructions, when executed, cause the network element to determine that the first voice call session has not been established between the first device and the second device further based on receiving, from the second device, an indication of refusal for the first voice call session.

18. The non-transitory computer-readable medium of claim 13, wherein the instructions, when executed, cause the network element to:

receive, from the first device and after sending the electronic communication, a first text message intended for the second device; and send, to the second device, the first text message.

19. A system comprising:

a network element; and a second device, wherein the network element is configured to:

determine, based on a first device requesting a first voice call session with the second device and based on presence information for the second device, that the first voice call session has not been established between the first device and the second device; and send, to the first device, an electronic communication indicating that a user associated with the second device prefers receiving a text message instead of a voicemail; and wherein the second device is configured to:

send, to the network element and prior to the first device requesting the first voice call session, the presence information.

20. The system of claim 19, wherein the presence information comprises at least one of:

a location of the second device;

a day or time;

one or more caller identities; or an activity level associated with the second device.

21. The system of claim 19, wherein the network element is configured to:

receive, from the first device, a request for the first voice call session; and send, to the second device, the request for the first voice call session.

22. The system of claim 19, wherein the network element is configured to:

receive, based on the presence information, a first text message indicating a request, from the first device, for a second voice call session; and send, to the second device, the first text message.

23. The system of claim 19, wherein the network element is further configured to determine that the first voice call session has not been established between the first device and the second device further based on receiving, from the second device, an indication of refusal for the first voice call session.

24. The system of claim 19, wherein the network element is configured to:

receive, from the first device and after sending the electronic communication, a first text message intended for the second device; and send, to the second device, the first text message.

* * * * *